(12) United States Patent
Lee et al.

(10) Patent No.: US 8,018,668 B2
(45) Date of Patent: Sep. 13, 2011

(54) LENS MODULE

(75) Inventors: Chai-Wei Lee, Taipei Hsien (TW);
Hou-Yao Lin, Taipei Hsien (TW);
Sheng-Jung Yu, Taipei Hsien (TW)

(73) Assignee: Hon Hai Precision Industry Co., Ltd.,
Tu-Cheng, New Taipei (TW)

( * ) Notice: Subject to any disclaimer, the term of this patent is extended or adjusted under 35 U.S.C. 154(b) by 0 days.

(21) Appl. No.: 12/764,967

(22) Filed: Apr. 22, 2010

(65) Prior Publication Data
US 2011/0090581 A1 Apr. 21, 2011

(51) Int. Cl.
*G02B 7/02* (2006.01)
(52) U.S. Cl. .................. 359/829; 359/811; 359/813
(58) Field of Classification Search .................. 359/811, 359/813, 819, 820, 829
See application file for complete search history.

(56) References Cited

U.S. PATENT DOCUMENTS

2008/0252966 A1* 10/2008 Karaki ........................ 359/391
2008/0297925 A1* 12/2008 Chen et al. .................. 359/829
* cited by examiner

*Primary Examiner* — Joseph P Martinez
*Assistant Examiner* — Brandi Thomas
(74) *Attorney, Agent, or Firm* — Altis Law Group, Inc.

(57) ABSTRACT

An exemplary lens module includes a barrel, a holder, and an elastic member. The barrel includes a first cylindrical part and a first threaded part. The first threaded part includes external threads. The barrel further includes a bottom surface facing the image side. The holder includes a second cylindrical part and a second threaded part. The second threaded part includes internal threads. The second cylindrical part includes a collar protruding from the inner cylindrical surface. The collar includes a top surface facing the object side. The barrel is coupled to the holder via the internal threads and the external threads. A fit between the internal threads and the external threads is a clearance fit. The elastic member is sandwiched between the bottom surface of the barrel and the top surface of the collar.

10 Claims, 3 Drawing Sheets

LENS MODULE

BACKGROUND

1. Technical Field

The present disclosure relates to optical imaging, and particularly to a lens module.

2. Description of Related Art

A typical lens module includes a holder and a barrel. In order to keep the barrel in place, the barrel is tightly screwed to the holder. The holder holds the barrel in position using the threads. Because the barrel is tightly screwed, it is difficult to assemble the barrel into the holder during assembly. Sometimes the barrel may become jammed/stuck in the holder.

Therefore, a new lens module is desired to overcome the above-mentioned problem.

BRIEF DESCRIPTION OF THE DRAWINGS

Many aspects of the present embodiment can be better understood with reference to the following drawings. The components in the drawings are not necessarily drawn to scale, the emphasis instead being placed upon clearly illustrating the principles of the present embodiment. Moreover, in the drawings, like reference numerals designate corresponding parts throughout the several views.

DETAILED DESCRIPTION

An embodiment will now be described in detail below with reference to the drawings.

Figure 1:
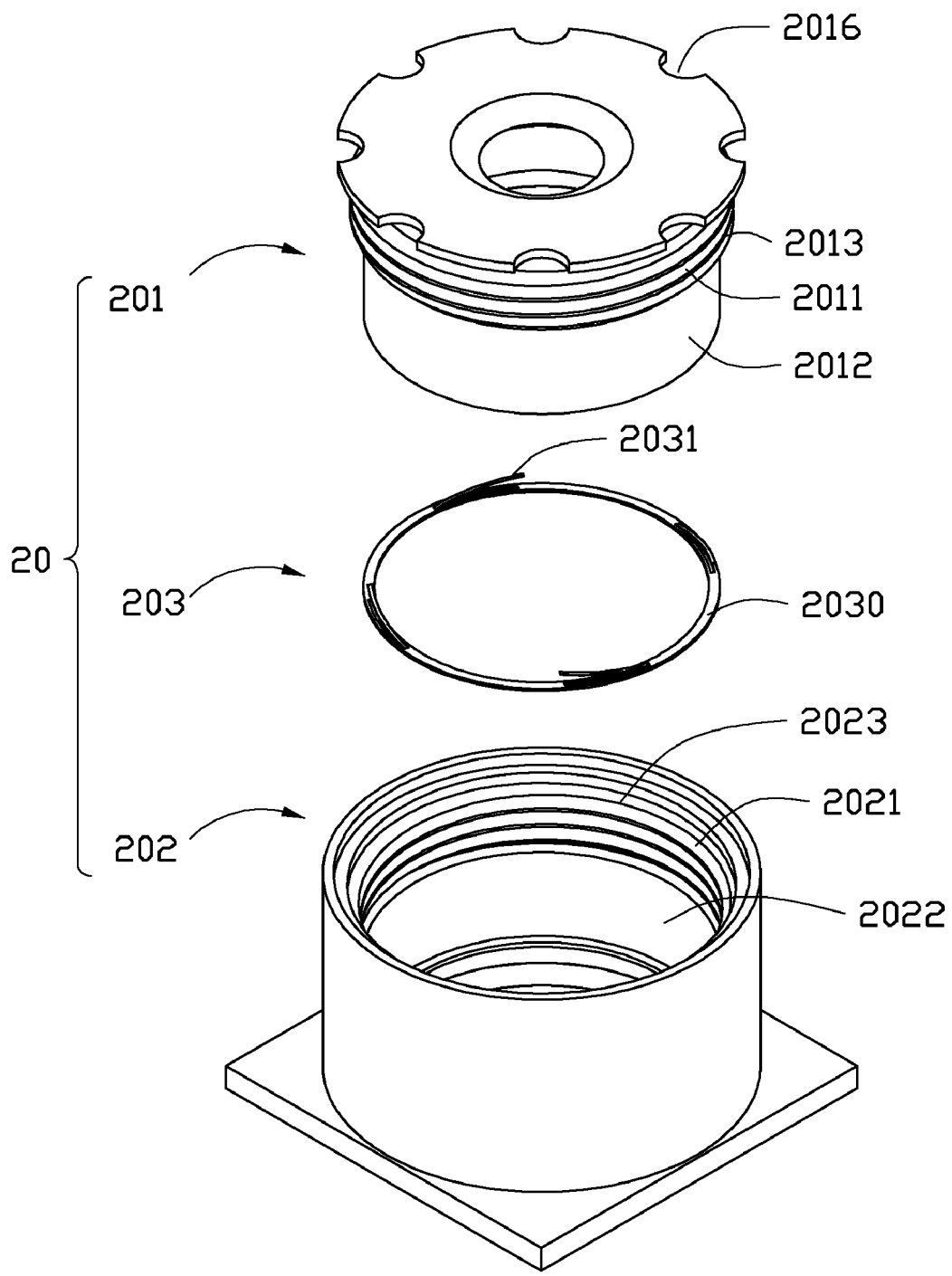
FIG. 1 is an exploded perspective view of a lens module according to an exemplary embodiment.
Figure 2:
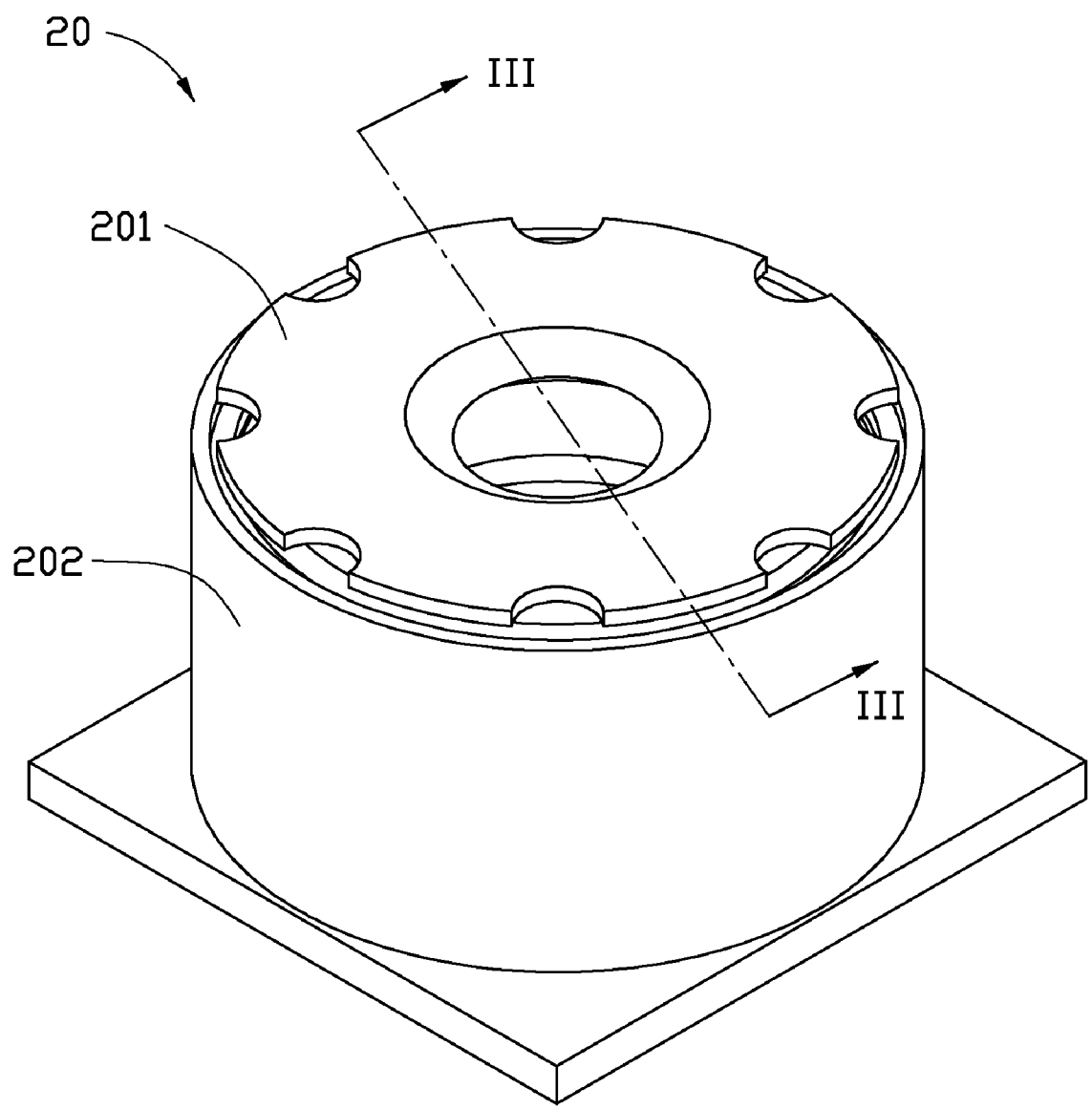
FIG. 2 is an assembled perspective view of the lens module of FIG. 1.
Figure 3:
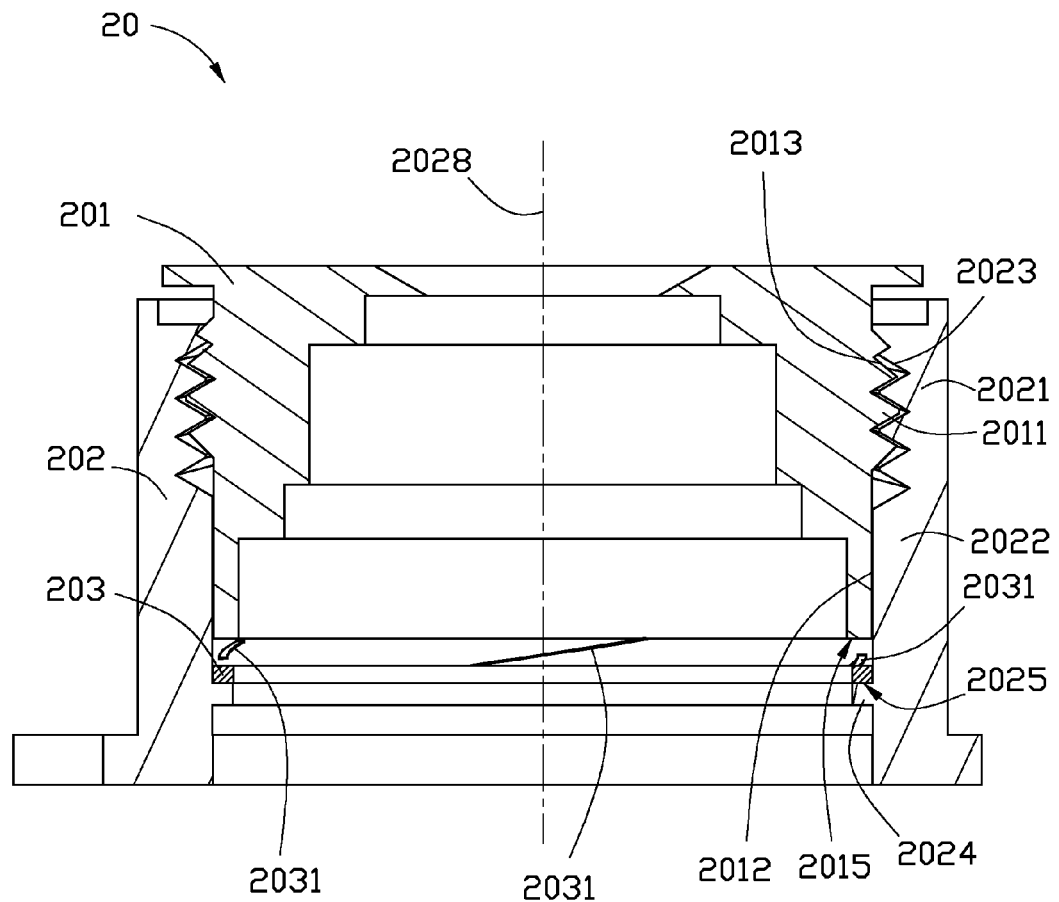
FIG. 3 is a cross-sectional view of the lens module of FIG. 2 taken along the line III-III thereof.

Referring to FIGS. 1-3, a lens module 20 according to an exemplary embodiment is shown. The lens module 20 includes a barrel 201, a holder 202, an elastic member 203, and a plurality of optical elements (e.g., lenses; not shown) received in the barrel 201.

The barrel 201 includes a first threaded part 2011 and a first cylindrical part 2012 in that order from the object side to the image side. The first threaded part 2011 has a plurality of external threads 2013. In the present embodiment, the first threaded part 2012 includes 2-3 external threads 2013. An outer diameter of the first cylindrical part 2012 is less than that of the external threads 2013. The barrel 201 further includes a bottom surface 2015 facing the image side.

The holder 202 is hollow and includes a through hole. The barrel 201 is received in the through hole. The holder 202 includes a second threaded part 2021 and a second cylindrical part 2022 from the object side to the image side. The inner cylindrical surface of the second cylindrical part 2022 is in contact with the outer cylindrical surface of the first cylindrical part 2012. The second threaded part 2021 includes a plurality of internal threads 2023. In the present embodiment, the second threaded part 2021 includes 2-3 internal threads 2023. The fit between the internal thread 2023 and the external thread 2013 is a clearance fit. That is, the internal thread 2023 is loosely coupled with the external thread 2013 of the barrel 201. An inner diameter of the second cylindrical part 2022 is larger than an outer diameter of the second threaded part 2022. The second cylindrical part 2022 includes a collar 2024 protruding from the inner cylindrical surface. The collar 2024 includes a top surface 2025 facing the object side.

The elastic member 203 is sandwiched between the bottom surface 2015 of the barrel 201 and a top surface 2025 of the collar 2024. In the present embodiment, the elastic member 203 is a ring-shaped spring. The elastic member 203 includes a ring-shaped part 2030 and spring tabs 2031. One end of each spring tab 2031 is connected to the ring-shaped part 2030, the other end of each spring tab 2031 curves (or bends) in a direction away from the ring-shaped part 2030, thus forming a free end. When the elastic member 203 is compressed along a direction parallel to a central axis 2028 of the holder 202, the elastic member 203 exerts a downward elastic force towards the top surface 2025 and an upward elastic force towards the bottom surface 2015 both forces acting in directions parallel to the central axis 2028 of the holder 202. The downward elastic force is substantially perpendicular to the top surface 2025, and the upward elastic force is substantially perpendicular to the bottom surface 2015. The downward elastic force and the upward elastic force are in opposite directions. In this way, the barrel 201 is kept stable relative to the holder 202.

In the present embodiment, the elastic member 203 includes four spring tabs 2031 equidistant from each other. It is to be understood that, in other embodiments, the total number of spring tabs can be two, three, and so on.

In the present embodiment, the spring tabs 2031 similarly curve away from the same side of the elastic member 203. It should be noted that, in other embodiments, the spring tabs 2031 can protrude from different sides (i.e., two opposite sides) of the elastic member 203.

Further, a plurality of recesses 2016 are defined in one end of the barrel 201 facing the object side. In assembly of the lens module 20, the barrel 201 can be held in place by a tool (not shown), such as a clamp used at the recesses 2016. Similarly, in achieving focus, the barrel 201 is rotated relative to the holder 202 in such a manner that the tool (e.g., the clamp) is coupled with the recesses 2016.

In the lens module 20, because the fit between the barrel 201 and the holder 202 is a clearance fit, it is easy to assemble the barrel 201 to the holder 202 and rotate the barrel 201 relative to the holder 202 in achieving focusing.

While certain embodiment have been described and exemplified above, various other embodiment from the foregoing disclosure will be apparent to those skilled in the art. The present disclosure is not limited to the particular embodiment described and exemplified but is capable of considerable variation and modification without departure from the scope and spirit of the appended claims.

What is claimed is:

1. A lens module comprising:

a barrel comprising a first cylindrical part and a first threaded part connected to the first cylindrical part in an order from an image side to an object side, the first threaded part comprising a plurality of external threads, the barrel further comprising a bottom surface facing the image side; a holder comprising a second cylindrical part and a second threaded part connected to the second cylindrical part in an order from the image side to the object side, the second threaded part comprising a plurality of internal threads, the second cylindrical part comprising a collar protruding from the inner cylindrical surface, the collar comprising a top surface facing the object side, the barrel being coupled to the holder through clearance fit engagement between the internal threads and the external threads; and an elastic member comprising a ring-shaped part and a plurality of elongated spring tabs stamped out from the ring-shaped part, one end of each spring tab is connected to the ring-shaped part, and another end of each spring tab is curved in a direction away from the ring-shaped part, thus forming a free end; the elastic member sandwiched between the bottom surface of the barrel and the top surface of the collar, the elastic member being configured for exerting a first elastic force to the barrel and a second elastic force to the holder so that the barrel is secured to the holder.

2. The lens module of claim 1, wherein the holder comprising a central axis, and the first and second elastic forces are in a direction parallel to the central axis of the holder.

3. The lens module of claim 1, wherein the inner cylindrical surface of the second cylindrical part is in contact with the outer cylindrical surface of the first cylindrical part.

4. The lens module of claim 1, wherein an outer diameter of the first cylindrical part is less than that of the external threads, and an inner diameter of the second cylindrical part is larger than an outer diameter of the internal threads.

5. The lens module of claim 1, wherein the elastic member is ring-shaped.

6. The lens module of claim 1, wherein the first elastic force is substantially perpendicular to the bottom surface of the barrel, and the second elastic force is substantially perpendicular to the top surface of the collar.

7. The lens module of claim 1, wherein the first and the second elastic forces are in reverse directions.

8. The lens module of claim 1, wherein the first threaded part consists of 2-3 external threads.

9. The lens module of claim 1, wherein the second threaded part consists of 2-3 internal threads.

10. A lens module comprising:

a barrel comprising a first cylindrical part and a first threaded part connected to the first cylindrical part in an order from an image side to an object side, the first threaded part comprising a plurality of external threads, the barrel further comprising a bottom surface facing the image side; a holder comprising a second cylindrical part and a second threaded part connected to the second cylindrical part in an order from the image side to the object side, the second threaded part comprising a plurality of internal threads, the second cylindrical part comprising a collar protruding from the inner cylindrical surface, the collar comprising a top surface facing the object side, the barrel being coupled to the holder through clearance fit engagement between the internal threads and the external threads; and an elastic member sandwiched between the bottom surface of the barrel and the top surface of the collar, the elastic member being configured for exerting a first elastic force to the barrel and a second elastic force to the holder so that the barrel is secured to the holder; the first elastic force substantially perpendicular to the bottom surface of the barrel, and the second elastic force substantially perpendicular to the top surface of the collar.

* * * * *